June 2, 1931.  R. W. McLEAN  1,808,312
TRIMMER FOR BRUSH BRISTLES
Filed Feb. 4, 1930
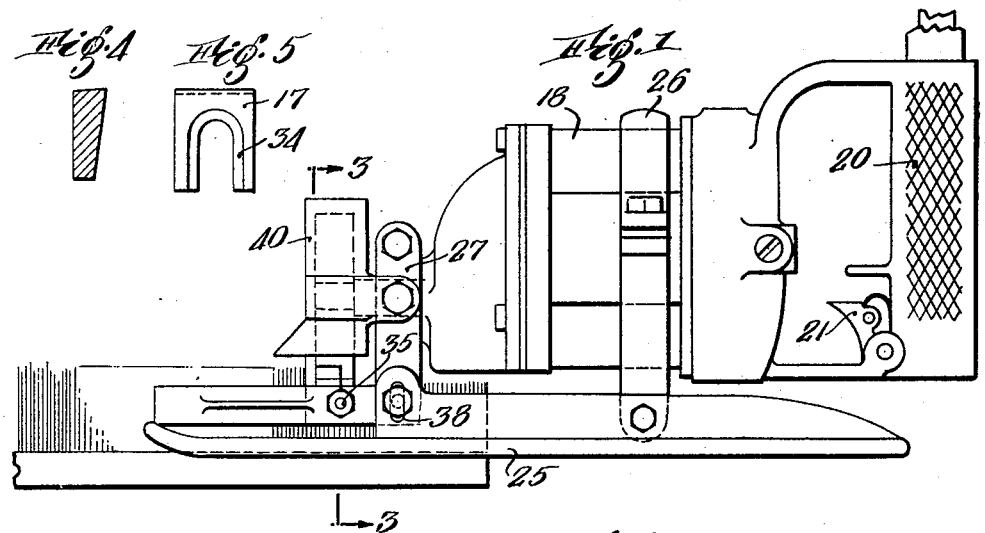
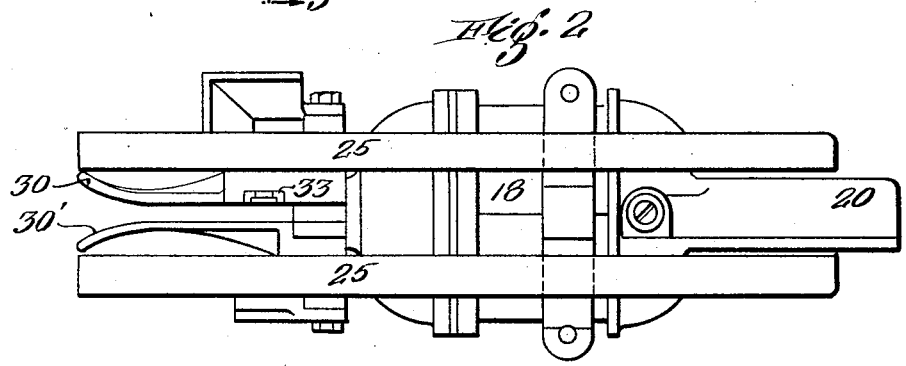
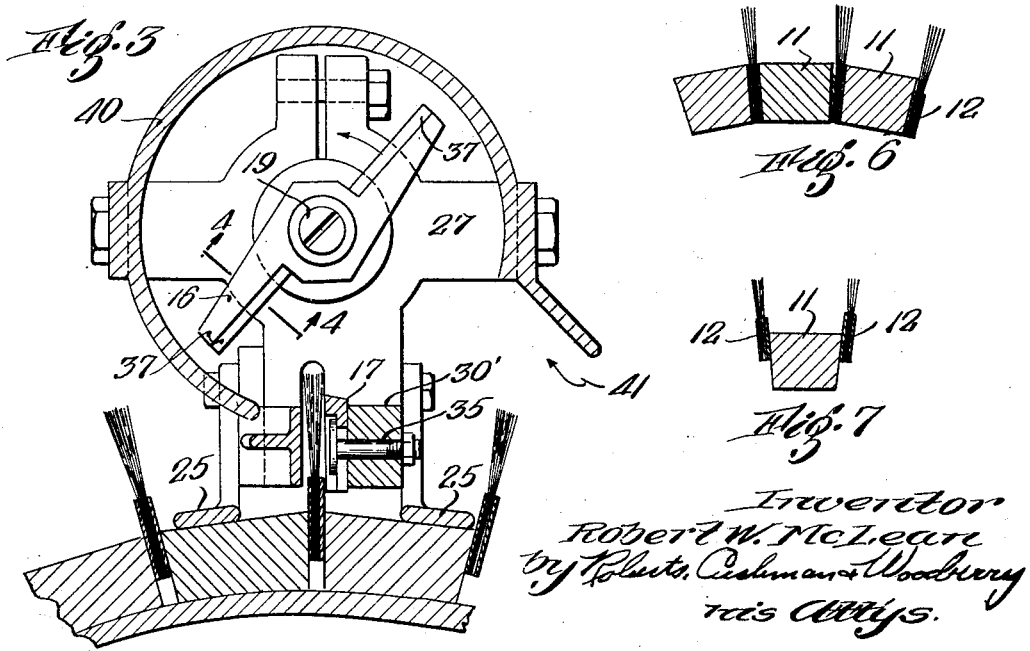

Patented June 2, 1931

1,808,312

UNITED STATES PATENT OFFICE

ROBERT W. McLEAN, OF BRIDGEWATER, MASSACHUSETTS, ASSIGNOR TO CARVER COTTON GIN COMPANY, OF EAST BRIDGEWATER, MASSACHUSETTS, A CORPORATION OF MASSACHUSETTS

TRIMMER FOR BRUSH BRISTLES

Application filed February 4, 1930. Serial No. 425,850.

This invention relates to trimmers for brush bristles, and has for some of its objects to facilitate the speedy trimming of brush bristles, to provide for their even trimming to a predetermined height, and to provide for the trimming of individual strips or groups of bristles. Additional features of advantage and novelty will be apparent from the following explanation of a specific instance of the invention, shown in the accompanying drawings by way of example.

My invention is particularly applicable to a device for trimming the bristles of the rotary doffing brushes of linter gins, such for example as the rotary doffing brush B shown in Figs. 11 and 25 of my Patent No. 1,599,024, of September 7, 1926. For the purpose of explaining my invention a specific embodiment thereof adapted for this use will be described, although my invention may be realized in many other forms, and may be employed for cutting or trimming articles other than brush bristles.

In the accompanying drawings,

Fig. 1 is a side elevation of a brush trimmer according to my invention, the apparatus being shown in operative relation to a brush being trimmed;

Fig. 2 is a bottom view of the brush trimmer;

Fig. 3 is a section on the line 3—3 of Fig. 1;

Fig. 4 is a section of a movable blade of the machine on the line 4—4 of Fig. 3;

Fig. 5 is a side view of the fixed blade;

Fig. 6 is an end view of a portion of a doffer brush cylinder; and

Fig. 7 is an end view of one of the lags of the doffer brush cylinder with its adjacent bristle strips set out radially from their original positions.

A rotary doffer brush for a linter gin may comprise a cylinder formed of a plurality of lags 11, is indicated in Fig. 6, and is provided with spaced rows of bristles in the from of bound bristle strips 12 retained between and extend radially from the lags.

The doffer brush usually wears unevenly, its rows of bristles eventually presenting jagged outlines. It is then advisable to trim the bristles, preferably after first setting out the individual bristle strips 12, as shown in Fig. 7, to compensate for the shortening of the bristles in trimming. A doffer brush is intended to cooperate with a rotary saw-toothed member in a gin, and it is highly desirable that the bristles extend to a uniform circumference in order that uniform contact may be had between the bristles and the cooperating saw toothed member. The doffer brush is in the form of a cylinder, and hence the bristles may satisfactorily be trimmed by cutting them off at a uniform height above the doffer brush cylinder.

It has previously been customary to trim these bristles by hand with a pair of shears. This is slow and fails to cut the bristles of a given row, or of different rows, to a uniform height. The brush trimmer herein described as an embodiment of my invention obviates these difficulties and facilitates the rapid and accurate trimming of all of the bristles.

My brush trimmer includes a pair of cooperating blades, one of which is movable with respect to the other, and in the illustrated embodiment these blades comprise the rotary double blade 16 and the cooperating normally fixed or leger blade 17. Means are provided for rotating the movable blade 16; for compactness, cheapness of construction and for imparting stability to the apparatus, I prefer to utilize as motive power a power unit 18 associated with the other elements of the trimmer and comprising an electric motor and reduction gearing. The rotary blade 16 is connected to the end of the driving shaft 19 of this power element. Preferably a handle 20 forms a part of the power unit and carries a suitable switch indicated at 21 for controlling the motor.

My brush trimmer is adapted to straddle a row of bristles. A suitable base is provided, preferably comprising laterally spaced base members 25 adapted to rest on the lagging of the doffer brush cylinder on opposite sides of the row of bristles to be trimmed. The power unit may be affixed to these base members 25 by means of a rear bracket 26 and a front bracket 27, and is elevated at a height sufficient to permit the trimmer to pass over the trimmed bristles without interference, as shown in Fig. 1.

In order to provide for uniform cutting of the row of bristles I prefer that the base members be adapted to bear upon the brush cylinder lagging or other supporting surface at points spaced longitudinally of the direction of movement of the trimmer. This is accomplished in the illustrated embodiment by having the base members 25 comprise elongated runners adapted to slide along the brush cylinder in continuous contact therewith.

I prefer to provide means for guiding the brush trimmer into cutting relation to the bristles, and in the illustrated embodiment this function is performed by each of two guide members 30 and 30' which project in a forward direction from the front supporting yoke 27 and are adapted to engage the sides of the bristle row to center the cutting blades relative thereto and to confine the bristles during the cutting operation. To facilitate the engagement of the brush trimmer with a row of bristles, these guide members are divergingly curved at their forward ends as shown in Fig. 2.

The construction of my brush trimmer is simplified by forming one of the guide members, for example, the guide member 30', integral with the yoke 27. Preferably this guide member is slotted at 33 to receive the fixed blade 17. This blade is provided with a rabbeted slot 34 adapted to receive a retaining bolt 35, and may be raised and lowered for adjustment. I prefer that the fixed blade 17 lie in substantial alignment with the bristle-engaging surface of the guide member by which it is carried so that it may pass smoothly by the bristles and in close relation thereto.

The cutting of the blades is improved by providing one of the blades, preferably the rotary blades 16, with slanting cutting faces, as shown for example at 37 in Fig. 3, whereby the cooperating blades trim the bristles with a "drawing cut". Preferably the outer ends of the rotary and the fixed blades are slanted away from the cutting edges so that after severance the bristles are not wedged between the cutting blades.

For adjustment of the height of the line of cut, the forward end of the power unit, the guides and the blades, may be raised or lowered by means of adjustable slotted connections 38 between the front bracket 27 and the base members 25, and thereby adjusted to the desired height above the bottom of the base members. However, whether or not the height of cut is rendered adjustable, it will be apparent that I have provided means for determining the distance between the base of the bristles and the line of cut. In the illustrated embodiment this means comprises one or more base members and a yoke, although it will be apparent that many other specific structures could be employed to perform this function.

A detachable guard 40, preferably supported by bracket 27 serves to protect the operator from accidental injury by the rotary blades, and directs the severed bristle particles downwardly through an opening 41 toward the brush cylinder.

In operation, the brush cutter is moved progressively along successive rows of bristles, cutting each row to a uniform predetermined height.

I claim:

1. A brush trimmer comprising cooperating cutting blades, base members spaced to receive a row of bristles therebetween, and a guide adapted to engage the side of a row of bristles for positioning the blades in cutting relation thereto.

2. A brush trimmer comprising cooperating cutting blades, base members spaced to receive a row of bristles therebetween and a guide adapted to engage the side of a row of bristles for positioning the blades in cutting relation thereto, one of said cutting blades being retained by said guide.

3. A brush trimmer comprising cooperating cutting blades, base members spaced to receive a row of bristles therebetween, a guide adapted to engage the side of a row of bristles for positioning blades in cutting relation thereto, and means for adjustably securing one of said blades to said guide.

4. A brush trimmer comprising cooperating cutting blades, a base member spaced to receive a row of bristles therebetween, and a pair of spaced guide members extending forward of said cutting blades and adapted to guide said blades into cutting relation to the row of bristles.

5. A brush trimmer comprising cooperating cutting blades, base members spaced to receive a row of bristles therebetween, a pair of spaced guide members extending forward of said cutting blades and adapted to guide said blades into cutting relation to the row of bristles, one of said cutting blades being retained by one of said guide members.

6. A brush trimmer adapted to be moved longitudinally with respect to a row of brush bristles, and comprising a pair of cooperating blades, one of said blades being movable with respect to the other, means for operating said movable blade, and base means for providing bearing points for the trimmer spaced longitudinally of the direction of movement thereof.

7. A brush trimmer adapted to be moved longitudinally with respect to a row of brush bristles and comprising a pair of cooperating blades, one of said blades being movable with respect to the other, means for operating said movable blade, and laterally spaced base members providing bearing points for the trimmer spaced longitudinally of the direction of movement thereof.

8. A brush trimmer adapted to be moved longitudinally with respect to a row of brush bristles and comprising a pair of cooperating blades, one of said blades being movable with respect to the other, means for operating said movable blade, and a pair of elongate runners adapted to receive a row of brush bristles therebetween and adapted to provide bearing points for the trimmer spaced longitudinally of the direction of movement thereof.

9. A brush trimmer comprising supporting means adapted to straddle a row of brush bristles, a power unit, a rotary cutter driven by said power unit, a bracket embracing part of said power unit and serving to connect said power unit to the base, said bracket having a horizontal extension comprising a guide adapted to engage the side of a row of bristles.

10. A brush trimmer comprising supporting means adapted to straddle a row of brush bristles, a power unit, a rotary cutter driven by said power unit, a bracket embracing part of said power unit and serving to connect said motor unit to the base, said bracket having a horizontal extension comprising a guide adapted to engage the side of a row of bristles, and a fixed blade retained by the extension and adapted to cooperate with said rotary blade.

11. A brush trimmer comprising cooperating cutting blades, a power unit for actuating one of said blades, a pair of base members laterally spaced to receive a row of bristles therebetween, and means for supporting said power unit at a height to permit it to move over a row of trimmed bristles.

12. A brush trimmer comprising cooperating rotary and fixed cutting blades, means for actuating said rotary blade, and a pair of base members laterally spaced to receive a row of bristles therebetween, said blade actuating means being at such a height as to permit it to move over a row of trimmed bristles.

13. A brush trimmer comprising cooperating rotary and fixed cutting blades, means for actuating said rotary blade, a pair of base members laterally spaced to receive a row of bristles therebetween, means for supporting said blade actuating means at a height to permit it to move over a row of trimmed bristles, and means for adjusting the height of said rotary blade above the bottom of said base members.

14. A brush trimmer comprising cooperating cutting blades, one of which is adapted to rotate, a pair of base members laterally spaced to receive a row of bristles therebetween, and means for adjustably retaining said blades at predetermined heights above the bottom of said base members.

15. A brush trimmer comprising cooperating cutting blades, one of which is rotatable, a power unit operatively connected to said rotatable blade, a pair of laterally spaced base members adapted to receive a row of bristles therebetween, and means adjustably connecting said power unit and at least one of said base members for retaining said rotatable cutter at predetermined adjustable heights.

16. A portable brush trimmer comprising cooperating cutting blades including a fixed blade having a portion adapted to engage the side of a row of bristles for positioning the same in cutting relation to the blades, and a runner adapted to engage the bristle-supporting member of the brush to determine the distance of the line of cut from said supporting member.

17. A portable brush trimmer comprising cooperating cutting blades, a runner adapted to engage the bristle-supporting member of the brush to determine the distance of the line of cut from said supporting member, and a guide adapted to engage the side of a row of bristles for positioning the same in cutting relation to the blades.

18. A portable brush trimmer comprising cooperating cutting blades, a runner adapted to engage the bristle-supporting member of the brush to determine the distance of the line of cut from said supporting member, a guide adapted to engage the side of a row of bristles for positioning the same in cutting relation to the blades, and a handle for manipulating the trimmer lengthwise of the row of bristles to be trimmed.

Signed by me at Boston, Massachusetts, this 24th day of January, 1930.

ROBERT W. McLEAN.